Figure 1:
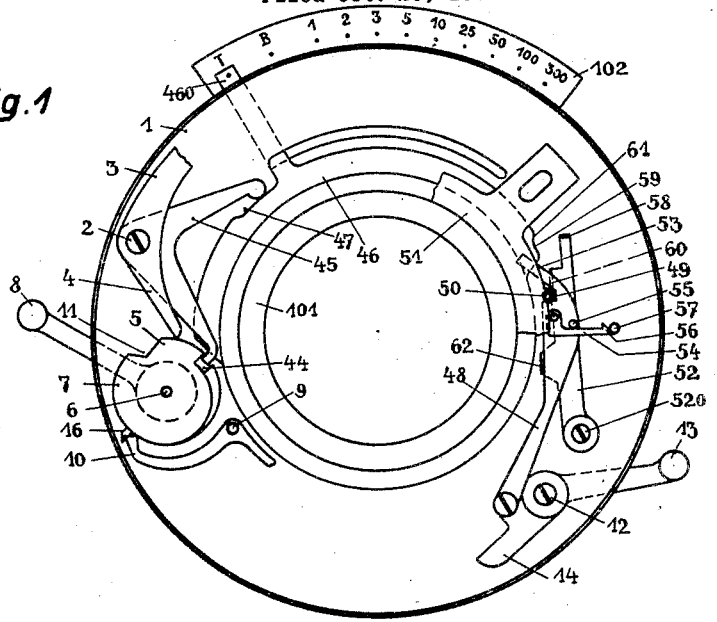

Nov. 1, 1932.  L. LUDWIG ET AL  1,886,283
CAMERA SHUTTER
Filed Oct. 20, 1931    3 Sheets-Sheet 1

Inventors:
Lothar Ludwig
Erhard Böhme
by Karl Michaelis
Atty.

Nov. 1, 1932.  L. LUDWIG ET AL  1,886,283

CAMERA SHUTTER

Filed Oct. 20, 1931  3 Sheets-Sheet 2

Inventors:
Lothar Ludwig
Erhard Böhme

Nov. 1, 1932. L. LUDWIG ET AL 1,886,283
CAMERA SHUTTER
Filed Oct. 20, 1931 3 Sheets-Sheet 3

Inventors:
Lothar Ludwig
Erhard Böhme

Patented Nov. 1, 1932

1,886,283

UNITED STATES PATENT OFFICE

LOTHAR LUDWIG, OF DRESDEN, AND ERHARD BÖHME, OF DRESDEN-LEUBEN, GERMANY, ASSIGNORS TO THE FIRM LOTHAR LUDWIG G. M. B. H., OF DRESDEN, GERMANY

CAMERA SHUTTER

Application filed October 20, 1931, Serial No. 569,942, and in Germany October 23, 1930.

Our invention relates to camera shutters of the type in which separate mechanisms are provided for time exposures on the one hand, and bulb exposures and snap shots on the other.

It is an object of our invention to provide a shutter of the type described which is superior to existing designs on account of its simplicity and its suitability for quantity production, without sacrificing exactitude of operation and durability.

To this end we provide, in combination with the usual rotary setting slide for locking and releasing the usual detent, a release, also of the usual type, with an operating pawl, and shutter-operating means such as a diaphragm ring adapted to be actuated by the pawl, and a bolt which cooperates with the pawl for arresting the shutter-operating means when the shutter is opened for "T"- (time) exposures and is controlled by means on the slide, normally the usual stepped curve at one of its ends, which when the slide is in the "B"-(bulb) exposure position, moves the bolt out of the way of the shutter-operating means, this bolt being equipped with means for moving the operating pawl also out of the way of the shutter-operating means when the slide is in one of its snap-shot positions.

The means for locking and releasing the detent under the control of the rotary slide may be the usual locking lever which in the "T"- and "B"-positions engages in a slot of the slide and is free to lock the detent while in the snap-shot positions of the slide it rides on the perimeter of the slide and is held against locking the detent. The slide may be arranged in the usual manner to rotate about the objective sleeve. By means of the stepped curve at one of its ends the slide engages the bolt which is preferably mounted to rock about a pivot and therefore will be referred to as the "rocking bolt", and moves it out of the way of a lug or pin on shutter-operating means which may be the diaphragm ring, so that the lug or pin is not arrested in the "B"-position and for the snap shots the rocking bolt engages the actuating pawl and moves it also beyond reach of the lug or pin on the diaphragm ring.

The simplification effected by the aforesaid design is particularly advantageous as it permits the building-in of a train of gears. Such trains of gears have already been suggested for less simple shutters, but in these shutters involve the drawback of extra complication.

The manipulation of the new shutter is particularly simplified by clutching means for winding the detent and the train of gears at the same time which clutching means is automatically thrown out after the winding has been completed.

Means such as a cam rotating with the train of gears may be provided for throwing out, as the train of gears runs down, a detent latch which locks the detent against operation.

In the drawings affixed to this specification and forming part thereof a shutter embodying our invention is illustrated diagrammatically by way of example.

In the drawings

Figure 2:
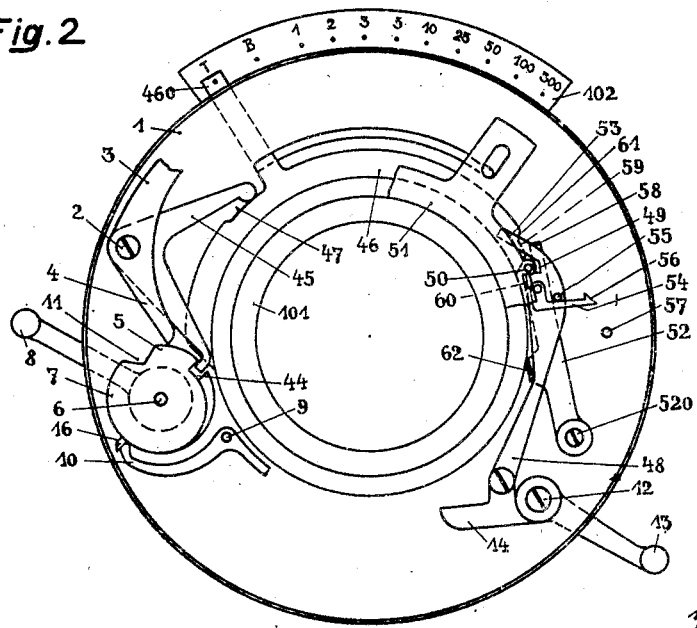
Figure 3:
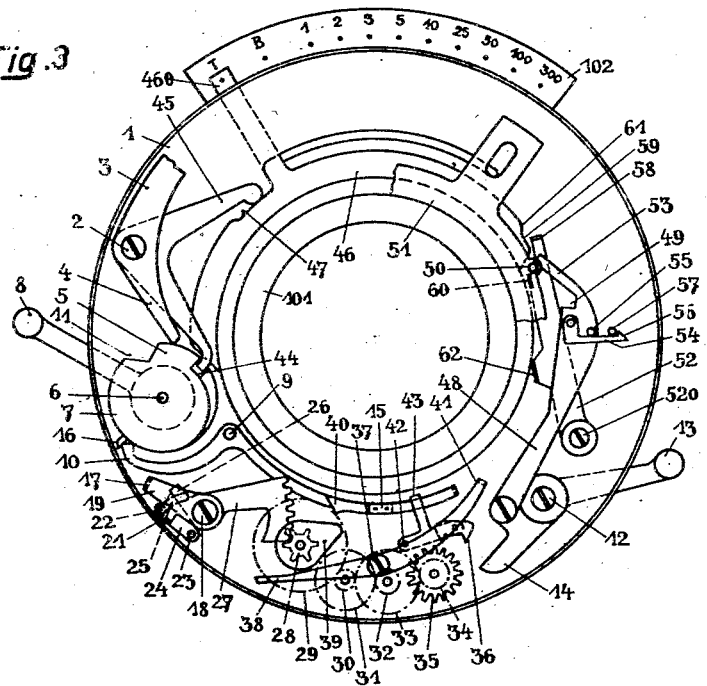
Figure 4:
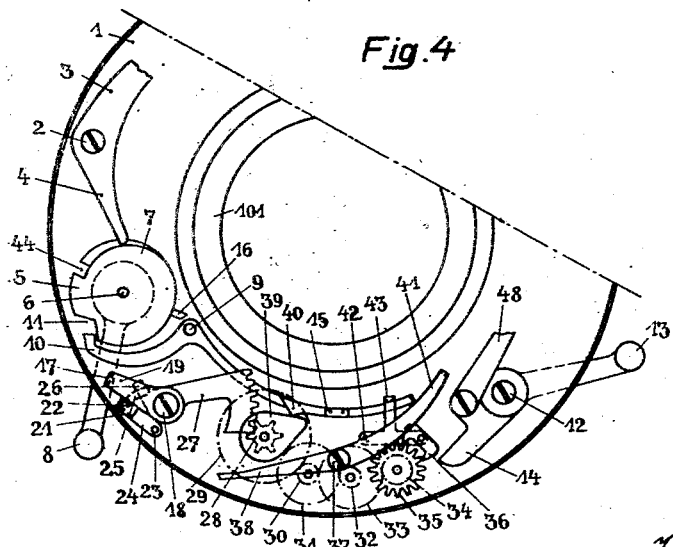
Figure 5:
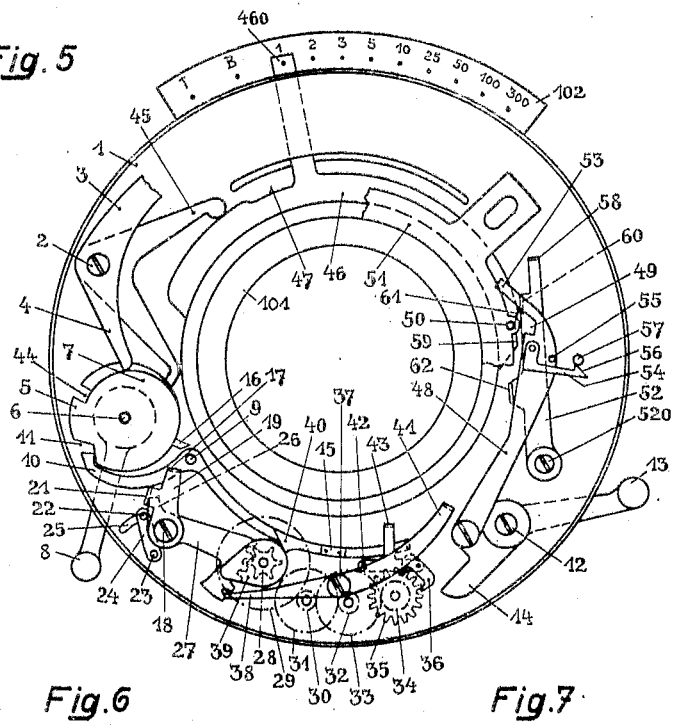
Figures 6, 7:
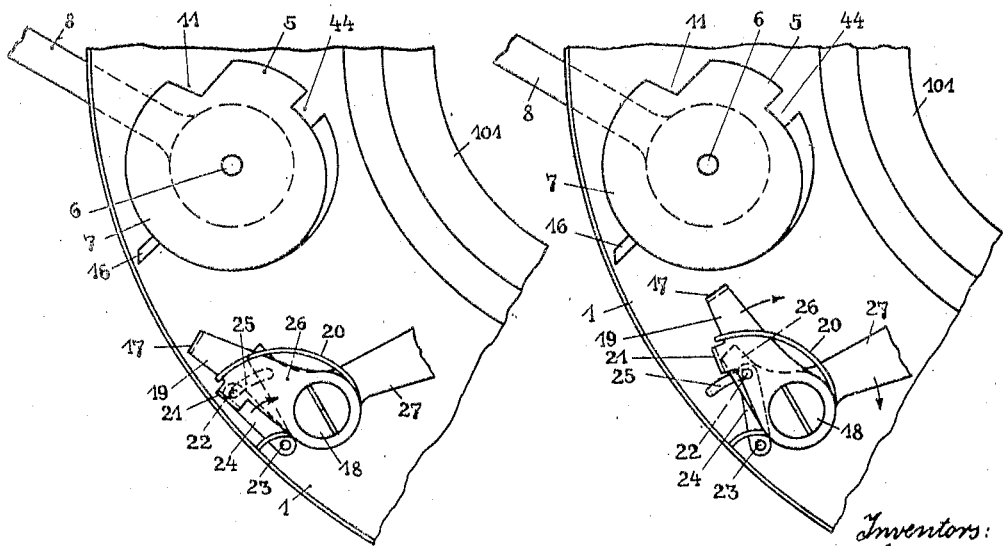

Fig. 1 is an elevation of the shutter, with its front cover removed and parts broken away, in its initial position with the slide set for a "T"-exposure, Fig. 2 shows the position of the parts when the shutter members are open and the operating pawl has just performed its active stroke, with the handle of the release depressed, Fig. 3 shows the parts in the position of Fig. 2 but with the release and operating pawl returned to their initial positions, Fig. 4 shows the positions of the parts with the detent wound up and the train of gears run down, Fig. 5 shows the parts in the position of Fig. 4 but with the detent and the train of gears wound up, and Figs. 6 and 7 show two positions of the clutching means referred to, drawn to a larger scale.

Referring now to the drawings, 1 is the casing of the shutter which is seated on the objective sleeve 101 in the usual manner, 102 is a scale on the casing which bears the usual indications, i. e., the letters "T" and "B" for time and bulb exposures, respectively, and the numerals 1 to 300 for snap shots. 46 is a curved setting slide, of known type, which is mounted to rotate on the sleeve 101, 460 is a handle for operating the slide, the outer end of the handle moving past the marks on the scale 102, 47 is a notch near one end of the slide 46 for releasing the angular locking lever 45 of the detent 7 when the handle 460 is at "T" or "B" on the scale 102, and 59, 60 is a stepped curve at the other end of the slide for throwing out the rocking bolt of the "time" mechanism in the "B"-position and for throwing out the bolt and the operating pawl together in the snap-shot positions of the handle 460. 51 is the diaphragm ring which is only partly shown in the drawings.

The detent 7 is of the usual type, with a notched disk, a spring (not shown) and a handle 8 which is depressed for putting tension on its spring. 2 is a pivot in the vicinity of the detent 7, and 3, 4 is the usual double-armed lever by which and through the medium of a pusher, not shown, the members of the shutter (not shown) are operated. 5 is a cam on the detent 7 by which the arm 4 of the operating lever is engaged. When the handle 8 is depressed for putting tension on the spring of the detent, as shown in Figs. 4 and 5, a detent latch 10, 15 which is fulcrumed at 9 in the casing 1, is moved by a spring, not shown, so that the hook-shaped end of its arm 10 engages in a notch 11 of the detent 7 and the detent is locked. 13 is the handle of the release which is fulcrumed at 12 and equipped with a return spring (not shown), and 14 is an extension which is connected to the handle 13 and adapted to engage the end of the arm 15 of the detent latch, lifting the end of the arm 10 out of the notch 11 and releasing the detent 7 which is now rotated by its spring so that the cam 5 actuates the operating lever 3, 4.

The time of exposure is regulated by the setting slide 46 which varies the position of the arm 4 of the operating lever with respect to the cam 5 so that the end of the arm extends into the reach of the cam 5 to a greater or lesser extent and the period during which the detent 7 actuates the lever 3, 4 is varied, and so is the time of exposure.

Means including a clutch are provided for winding the usual train of gears 28—35, Figs. 3, 4 and 5, through the medium of the detent 7. The clutch is operated by a pin 16 on the detent which cooperates with a clutching lever 19 fulcrumed at 18. Mounted to rock on the pivot 18 is a double-armed lever 26, 27. The arm 27 is equipped with a sector which meshes with the first pinion 28 of the train of gears. 17 is a lug at the end of the lever 19 which is adapted to be engaged by the pin 16 when the lever is in the position illustrated in Fig. 7. 20 is a spring which tends to rotate the lever 19 clockwise but its rotation is limited in the position illustrated in Fig. 6 by a pin 22 and a lug 21 on the lever 19 which engages the pin 22. The pin 22 is arranged at the free end of an arm 24 which is mounted to rock about a pivot 23 against a certain friction, and a portion of the pin 22 extends from the casing 1 through a slot 25 by which it may be handled. By moving the lever 24 in the direction of the arrow, Fig. 6, the lever 19 is released and rotated clockwise by its spring 19, as shown in Fig. 7 whereupon the lug 21 engages the arm 26 and the lug 17 at the free end of the arm 19 moves within reach of the pin 16 while at the same time the lug 21 moves beyond reach of the pin 22 on account of the eccentric position of the pivots 18 and 23.

If the detent 7 is wound by depressing its handle 8 the pin 16 strikes the lug 17 at the end of the lever 19 and rotates the lever 19 and the arm 27 as indicated by the arrows in Fig. 6, the sector rotating the pinion 28 and winding up the train of gears. The train includes the gear wheels and pinions 28, 29, 30, 31, 32, 33 and 34. 35 is the main gear wheel of the train which cooperates with a detent 36 at the end of a T-lever 43 which is fulcrumed at 42. 38 is a locking pawl which is fulcrumed at 37, Fig. 5, and engages in the last tooth of the sector at arm 27 under the action of a spring, not shown, when the sector has completed the winding of the train. While the sector is locked the pin 16 moves past the lug 17 and into the position illustrated in Fig. 5 where it does not interfere with the lug while the train runs down and the sector rotates. At the same time the arm 10 of the detent latch engages to the full depth in the notch 11 of the detent 7 with its hook.

39 is a cam on the shaft of the first pinion 28 and 40 is a cam plate on the arm 15 of the detent latch which is controlled by the cam as it rotates with the pinion 28. In the position illustrated in Fig. 5 the cam plate 40 bears on the concentric portion of the cam 39. In this position the arm 15 is at the outer end of its stroke, the hook at its arm 10 engaging fully in the notch 11, and the end of the arm 15 is in reach of the extension 14 of the release handle 13. When the train of gears has been wound, Fig. 4, the eccentric portion of the cam 39 engages the cam plate 40 and lifts the hook at the end of arm 10 partly out of its notch 11. The arm 15 of the detent is beyond reach of the extension 14 and the extension only acts on the end 41 of the locking pawl 38. When the locking pawl is lifted out of the sector at the arm 27 the train runs down and the cam 39 lifts the hook of arm 10 completely out of the notch 11, releasing the detent 7.

The central arm of the T 43 has a lug at its end which cooperates with the arm 15 of the detent latch. While the hook at the end of 10 is not in the notch 11 but rides on the perimeter of the detent 7, Fig. 3, the T 43 is retained by the arm 15 and its detent 36 is lifted out of the main gear wheel 35 so that the winding of the train is not interfered with by the detent 36.

The mechanism for locking the detent 7 in the positions "T" (time) and "B" (bulb) on the scale 102 will now be described. 44 is a notch in the detent 7 at the side of the cam 5 which is opposite the notch 11, and 45 is an angular locking lever which is fulcrumed about the pivot 2 of the operating lever 3, 4. Its outer end is adapted to engage in the notch 44 and its inner end bears on the outer perimeter of the setting slide 46 under the pressure of a spring, not shown. When the inner rounded end of the locking lever 45 engages in the notch 47, its outer end engages in the notch 44 of the detent as shown for "T" in Figs. 1, 2 and 3. The detent 7 is now locked. The described mechanism for locking it is superior to the usual locking by a push bar operated by the detent 7 because it is so much simpler.

48 is the operating pawl of the diaphragm ring 51 which is pivoted to the release extension 14 at one end and with a notch 49 at its other end engages a pin 50 on the diaphragm ring 51 under the influence of a spring, not shown, which tends to move the pawl 48 in the direction of the objective axis so that the notch 49 engages the pin 50, as shown in Fig. 2. If the release handle is permitted to return into its initial position under the action of its spring (not shown) the operating pawl 48 is retracted as shown in Figs. 1, 3, 4 and 5 but does not move in the same manner as when it was advanced. It has a projection 53 at its free end which when the pawl is retracted moves it away from the axis of the objective. 54 is a spring catch which is fulcrumed on the operating pawl 48, and 57 is a pin on the casing which is adapted to be engaged by a hook 56 at the outer end of the catch when the pawl 48 is moved outwardly by the pin 50 as shown in Fig. 3. 55 is a check on the pawl which limits the movement of the catch 54 under the action of its spring, not shown. When the pawl 48 is retracted by its return spring, its free end is guided in a circular path about the pin 57 by the catch 54 and with its projection 53 engages a hook 58 at the free end of a rocking bolt 52 which is fulcrumed at 520 and under the action of a spring, not shown, tends to engage the pin 50 with a step at the inner end of the hook 58, as shown in Figs. 2 and 3. When the projection 53 of the pawl 48 engages the hook 58 at the end of the rocking bolt on the path on which it is guided by the spring catch 54 the rocking bolt 52 releases the pin 50.

The rocking bolt 52 must become active only for "T"-exposures but must be cut out for "B" and instantaneous exposures. The stepped curve 59, 61 on the slide 46 the end 59 of which when the ring is moved into the "B"-position on the scale 100, engages a lug 60 on the rocking bolt 52, prevents its engagement with the pin 50. The consequence is that when the operating pawl 48 is now retracted the diaphragm ring 51 moves clockwise and the shutter closes, the pin 50 being not interfered with by the projection 53 on the free end of the pawl 48. In this case the pawl 48 returns as it came, and the catch 54 does not engage with the pin 57.

If the handle 460 is moved into one of the "instantaneous" positions 1 to 300 on the scale 100 as shown for the position "1" in Fig. 5 the locking lever 45 rides on the perimeter of the slide 46 so that its outer end is moved out of the notch 44 in the detent 7. At the same time step 61 at the other end of slide 46 engages below the lug 60 on the rocking bolt 52, forcing the bolt so far away from the axis of the objective that a second lug 62 on the rocking bolt 52 engages the operating pawl 48 and turns it until its notch 49 is free of the pin 50 while on the other hand the spring catch 54 does not yet engage behind pin 57 with its hook 56, and the "time" mechanism remains inactive.

It will be understood that in this manner the rocking bolt 52 which must become active only for the "T"-position, is moved out of the way for "B"- or bulb exposures, and for snap shots moves the operating pawl 48 out of the way of pin 50.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:

1. A camera shutter comprising a rotary slide, a detent, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

2. A camera shutter comprising a rotary slide, a detent, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, a projection on said locking pawl, a pin on said shutter-operating means adapted to engage said projection, a spring catch on said locking pawl, a pin adapted to be engaged by said spring catch and to arrest said pawl in the position to which it has been moved by the pin on said shutter-operating means, and means on said bolt adapted to be engaged by the projection on said operating pawl for throwing out said bolt with respect to said shutter-operating means.

3. A camera shutter comprising a rotary slide, a detent, a train of gears operatively connected to said detent, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

4. A camera shutter comprising a rotary slide, a detent, a train of gears, a clutch operatively connecting said detent of said train of gears, means for automatically throwing out said clutch when said train has been wound, a detent latch for arresting said detent, means operatively connected to said train for throwing out said detent latch, a release for throwing out said latch independently of said train, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

5. A camera shutter comprising a rotary slide, a detent, a train of gears, a clutch operatively connecting said detent to said train of gears, and including a lever adapted to be engaged by a pin on the detent, means for automatically throwing out said clutch when said train has been wound, a detent latch for arresting said detent, said lever and said pin being adapted to move with respect to each other so that said pin entrains said lever when said detent is wound, and releases it before said detent latch is thrown out, means operatively connected to said train of gears for throwing out said detent latch, a detent in said train of gears adapted to be thrown in after the operative connection of said pin and said lever has been interrupted, a release for throwing out said latch independently of said train, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

6. A camera shutter comprising a rotary slide, a detent, a train of gears, a clutch operatively connecting said detent to said train of gears, and including a lever adapted to be engaged by a pin on the detent, resilient means operatively connected to said lever, a pin adapted to be displaced manually and to be engaged by said lever under the pressure of said resilient means, means for winding said train of gears, and a lug on said means adapted to be engaged by said lever under the pressure of said resilient means after it has been released by said pin; a detent latch for arresting said detent, means operatively connected to said train for throwing out said detent latch, a release for throwing out said latch independently of said train, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

7. A camera shutter comprising a rotary slide, a detent, a detent latch for arresting said detent, a train of gears operatively connected to said detent, a cam forming part of said train of gears which is so arranged as to limit the movement of said detent latch when said train of gears has run down but to release the latch when the train is wound, a release so arranged with respect to said latch that the latch moves out of reach of said release when arresting said detent, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

8. A camera shutter comprising a rotary slide, a detent, a detent latch for arresting said detent, a train of gears operatively connected to said detent, a cam forming part of said train of gears which is so arranged as to limit the movement of said detent latch when said train of gears has run down but to release the latch when the train is wound, a locking pawl for said train of gears adapted to be controlled by said cam, a release so arranged with respect to said latch that the latch moves out of reach of said release when arresting said detent, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

9. A camera shutter comprising a rotary slide, a detent, a detent latch for arresting said detent, a train of gears operatively connected to said detent, another detent in said train of gears, means operatively connected to said detent latch for throwing in said other detent when said detent latch is in position for arresting said first-mentioned detent, and for throwing out said other detent when out of its arresting position, means operated by said rotary slide for locking and releasing said detent, a release, an operating pawl connected to said release, shutter-operating means adapted to be actuated by said pawl, a bolt adapted to cooperate with said pawl and to arrest said shutter-operating means in the "T"-position of said slide, means on said slide for throwing out said bolt with respect to said shutter-operating means in the "B"-position of said slide, and means on said bolt for throwing out said operating pawl with respect to said shutter-operating means in the snap-shot positions of said slide.

In testimony whereof we affix our signatures.

LOTHAR LUDWIG.
ERHARD BÖHME.